(12) United States Patent
Axel

(10) Patent No.: US 6,688,259 B2
(45) Date of Patent: Feb. 10, 2004

(54) HANDLE WITH GRIP FOR COMFORTABLY HOLDING ARTICLES BY HAND

(76) Inventor: Wendy Axel, 1442A Walnut St., Berkeley, CA (US) 94709

( * ) Notice: Subject to any disclaimer, the term of this patent is extended or adjusted under 35 U.S.C. 154(b) by 0 days.

(21) Appl. No.: 09/871,506

(22) Filed: May 31, 2001

(65) Prior Publication Data

US 2002/0179023 A1 Dec. 5, 2002

(51) Int. Cl.$^7$ ............................................. A01K 27/00
(52) U.S. Cl. ....................................... 119/792; 119/856
(58) Field of Search .................... 16/DIG. 12, DIG. 25, 16/421, 431; 269/5, 6; 294/902, 167; 24/598.1–598.3, 69 J, 573.11, 574.1, 577.1, 578.13, 582.11, 596.1; 119/770, 772, 792, 795, 856, 858

(56) References Cited

U.S. PATENT DOCUMENTS

| | | | | |
|---|---|---|---|---|
| 1,219,199 A | * | 3/1917 | Troop | 24/376 |
| 2,550,038 A | * | 4/1951 | Brown | 24/374 |
| 2,833,454 A | | 5/1958 | McGee | |
| 2,983,980 A | | 5/1961 | Hamel | |
| 3,120,403 A | | 2/1964 | Molzan et al. | |
| 3,563,430 A | * | 2/1971 | Forrest | 224/255 |
| 4,095,316 A | * | 6/1978 | Gabriel | 226/200 |
| 4,380,093 A | * | 4/1983 | Morgan | 16/421 |
| D271,466 S | * | 11/1983 | Boissonnet | D8/367 |
| 4,785,495 A | * | 11/1988 | Dellis | 16/421 |
| 4,811,467 A | | 3/1989 | Lowe | |
| 4,835,823 A | | 6/1989 | Contat | |
| 4,890,355 A | * | 1/1990 | Schulten | 16/421 |
| 4,964,192 A | * | 10/1990 | Marui | 16/111 |
| 5,005,266 A | | 4/1991 | Fister et al. | |
| 5,010,850 A | | 4/1991 | Sailer | |
| 5,155,878 A | * | 10/1992 | Dellis | 16/421 |
| 5,210,914 A | | 5/1993 | Katsma | |
| 5,329,675 A | * | 7/1994 | McLean et al. | 24/588.11 |
| 5,361,726 A | | 11/1994 | Harris et al. | |
| 5,517,949 A | | 5/1996 | Harris et al. | |
| 5,729,864 A | * | 3/1998 | Lie et al. | 16/421 |
| 5,878,834 A | | 3/1999 | Brainerd et al. | |
| D432,027 S | * | 10/2000 | Fox et al. | D10/2 |
| 6,148,483 A | * | 11/2000 | DeGraff | 16/421 |
| D448,276 S | * | 9/2001 | Kelleghan | 24/573.11 |
| 6,338,463 B1 | * | 1/2002 | Babitz et al. | 248/306 |

* cited by examiner

*Primary Examiner*—Robert P. Swiatek
*Assistant Examiner*—Susan L. Piascik
(74) *Attorney, Agent, or Firm*—Amster, Rothstein & Ebenstein LLP

(57) ABSTRACT

A simple, strong handle for use as a grip for holding articles comprising a carabiner-like snap hook provided with a gripping surface of the proper size and shape to be comfortably held by a human hand. The snap hook has a generally C-shaped back portion on which the gripping surface is disposed, and a gate selectively attached to the back portion, forming a closed loop. Articles such as shopping bags and animal leashes received by the snap hook and secured by the gate may be held comfortably by the grip. The snap hook may be made of a variety of materials and shapes depending on the application and requirements of the user.

3 Claims, 5 Drawing Sheets

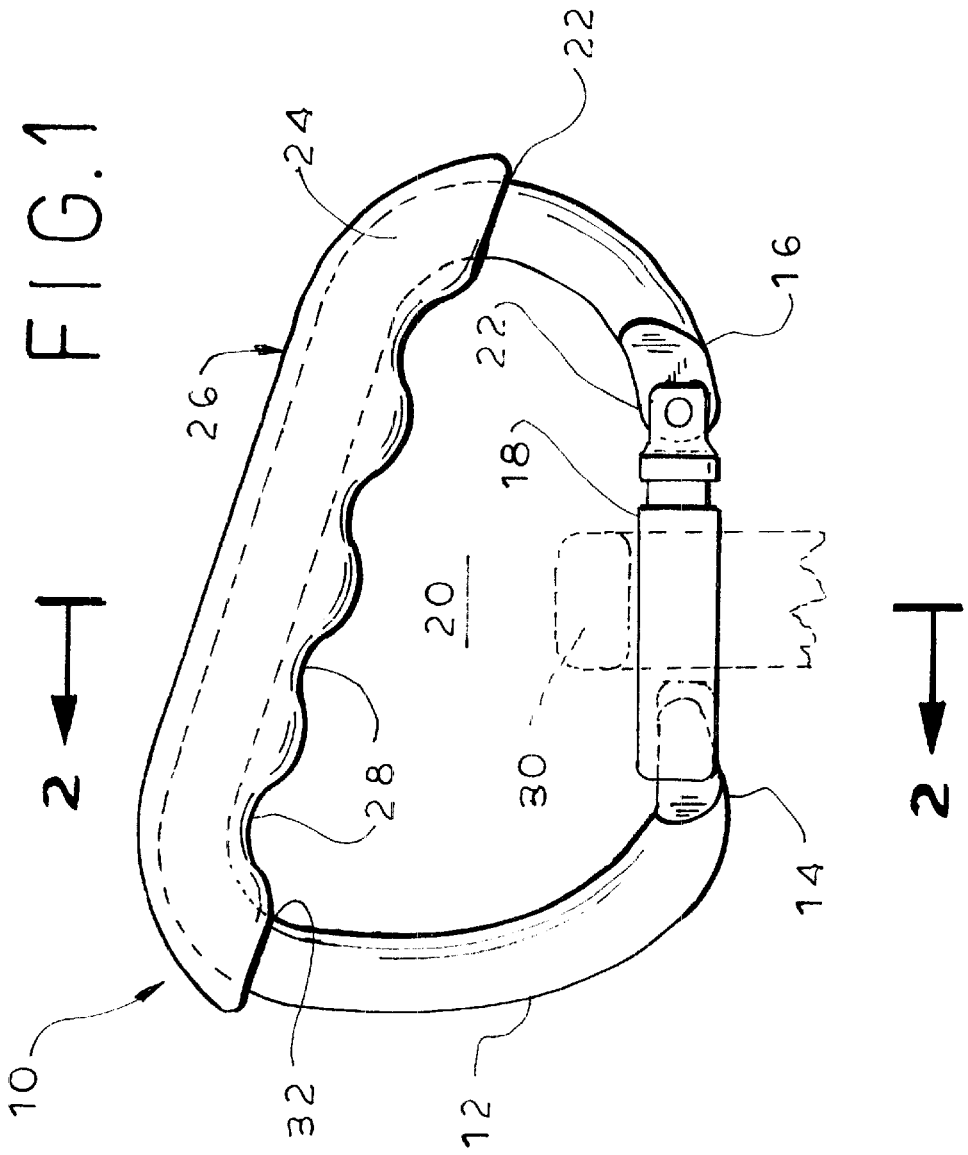

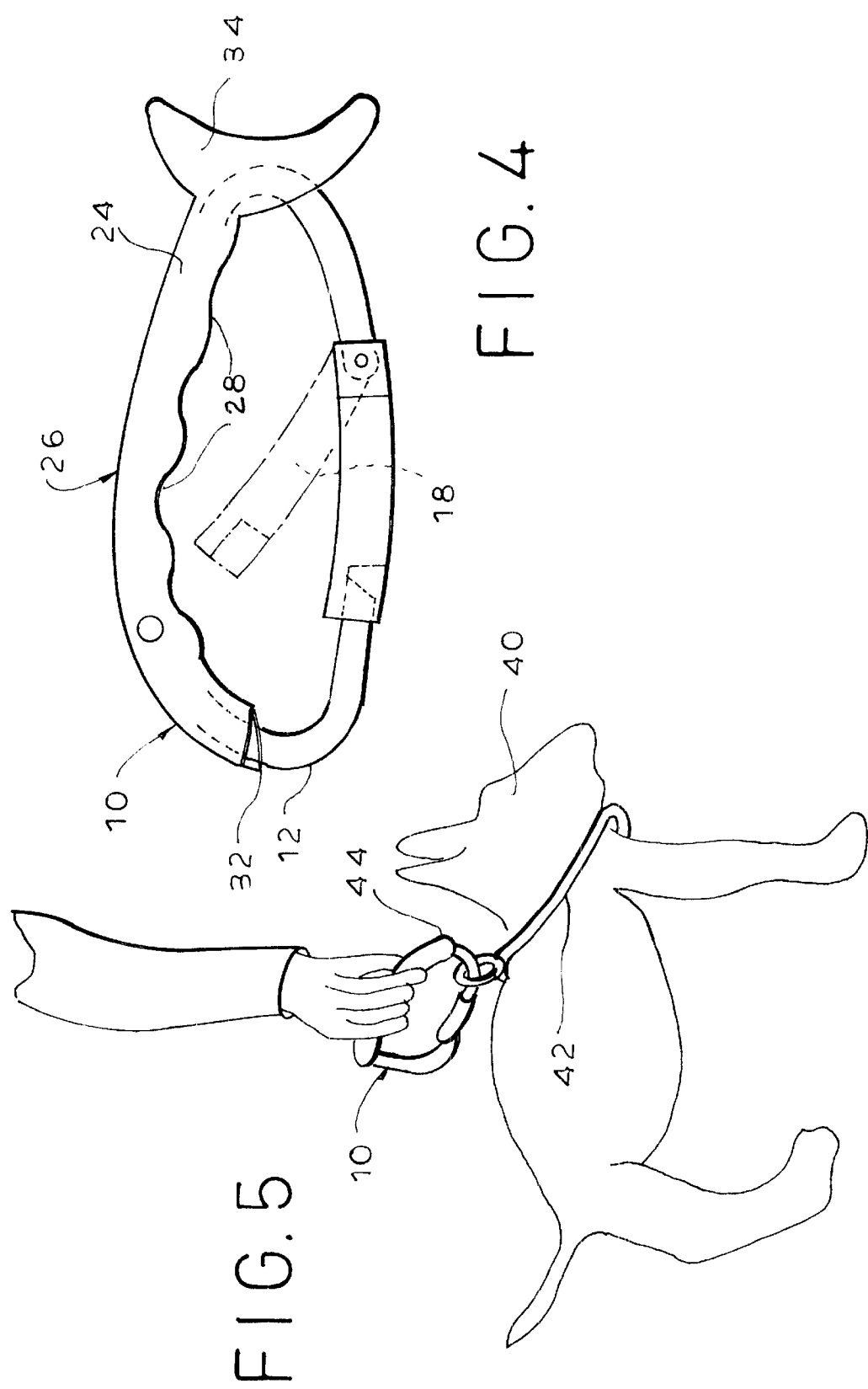

FIG. 8
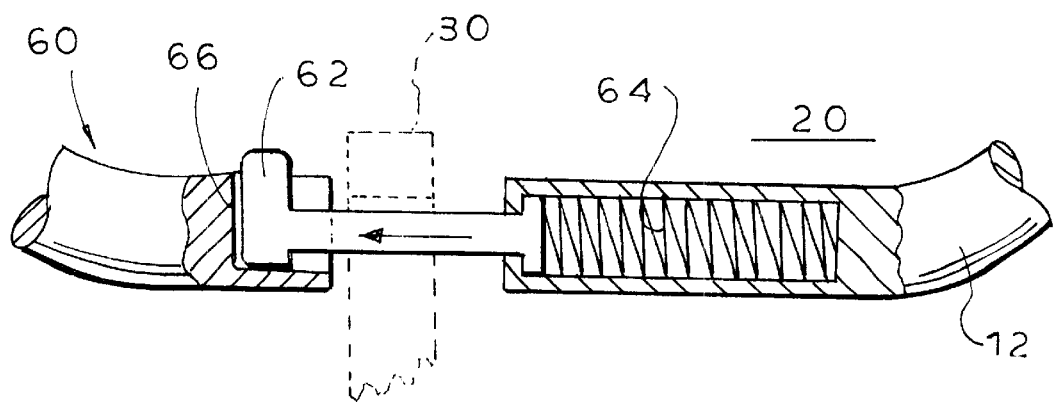
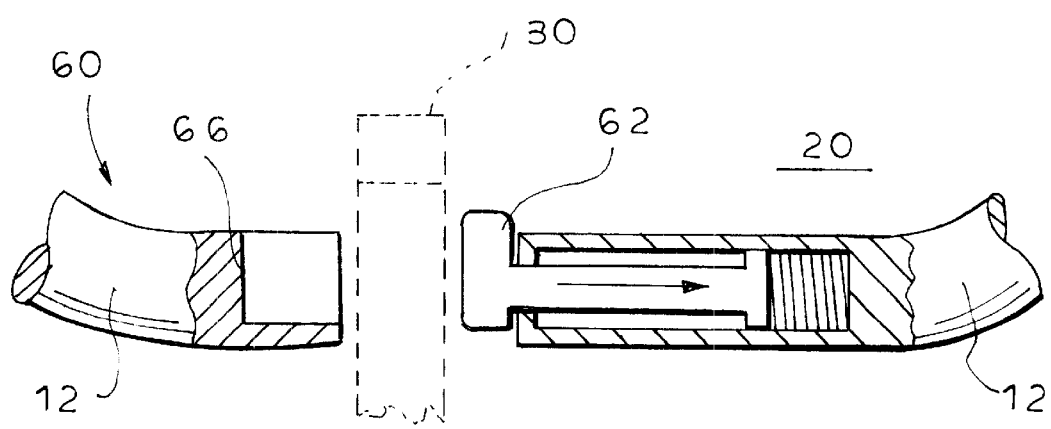
FIG. 9

HANDLE WITH GRIP FOR COMFORTABLY HOLDING ARTICLES BY HAND

BACKGROUND OF THE INVENTION

The present invention relates to a snap hook that forms a handle for securing items engaged by the hook. Specifically, the snap hook has a C-shaped back and a self closing gate attached at one end of the C-shaped back and biased against the other end forming a closed loop. A comfortable grip is provided on the back portion of the snap hook adapted to be gripped by a human hand to carry or hold the items secured by the hook.

C-shaped snap-hooks, also known as carabiners are widely recognized in the art and have found use in applications ranging from mountain climbing to animal control. U.S. Pat. No. 5,005,266 to Fister et al. discloses an improved carabiner and some of its typical uses, such as to secure loops of rope, a strap, or an embedded toggle or in conjunction with another carabiner. Fister et al. stresses a strong snap hook having a self-closing gate that makes the insertion of a rope easier for mountain climbers who may be preoccupied with difficult climbing maneuvers. U.S. Pat. No. 5,517,949 to Harris et al. discloses the use of a modified carabiner as part of a lead for animal control, such as to connect an ordinary leash to the collar of a dog.

In each of these cases, the carabiner is used to secure loops of ropes or other objects together. Thus, the carabiner of the prior art is designed to function merely as a link in a chain that can be selectively attached, and easily removed. In the case of Harris et al., such a use is disclosed in a leash for animal control wherein a modified carabiner is attached at each end of a flat woven strap. In this configuration, hands-free control of an animal is made possible by attaching the first carabiner to the animal's collar and the second to a handler's belt, or article of clothing. Similarly, in mountaineering, carabiners are known to be used to hold ropes between rock formations and a climber.

Although prior art patents such as Fister et al. and Harris et al., disclose various highly specialized uses for carabiner-type snap hooks, the function of such hooks is generally limited to that of a fastener and does not contemplate use as a handle. Therefore, whereas known carabiners can hold objects together, they are not designed to facilitate the carrying or holding of those objects by a human hand. Indeed, the snap hooks of the prior art are particularly uncomfortable to hold because they are not sized or shaped properly for a hand. Furthermore, loops of rope or straps tend to shift position along the periphery the interior of the snap hook, creating the potential for injury to the hand. Finally, typical carabiners such as those used in mountain climbing need to be strong enough to support the weight of a climber, and must be light to minimize the weight a climber must carry. The materials needed, therefore, are relatively expensive.

Therefore a need exists for a generally C-shaped snap hook that can be opened and closed to securely hold one or more articles and is modified to comfortably admit a human hand so that the articles may be held by the snap hook. A further need exists for such a snap hook that is safe and inexpensive and can be made from a wide variety of materials.

SUMMARY OF THE INVENTION

The snap hook disclosed herein is a modified carabiner of a type well known in the art having a generally C-shaped back constructed of a rigid material such as metal or plastic, and an articulating gate member connected across the free ends thereof, and biased in the closed position. The snap hook of the present invention, however, has the considerable advantage of being safely and comfortably held by hand when used as a handle or carrying implement. As used herein, the term C-shaped is not intended to be limited to that form, but can encompass any open shape with two ends.

According to an embodiment of the present invention, the C-shaped back of the snap hook is provided with a grip that conforms generally to the shape of a human hand. The back of the snap hook may be provided with ridges or grooves having spacing that conforms to the fingers of a hand, or a resilient coating may be provided to cushion the hand thereby facilitating the holding thereof.

According to another embodiment of the present invention, a covering such as rubber, plastic or leather is provided as a grip in the form of a sleeve which may also have ridges or a resilient surface and is adapted to be placed over the back of the snap hook. In case a resilient material such as rubber or foam is used for the sleeve, the grip will naturally conform to the shape of a hand when gripped by the user. Furthermore, the raised surface created by the sleeve acts to prevent articles held by the snap hook from sliding across the gate and onto the grip preventing discomfort or injury to the hand of the user.

According to another embodiment of the present invention, the shape of the snap hook may be rounded, square, irregular, or may adopt a whimsical shape, such as that of a heart or a fish, although retaining a generally C-shaped structure. An advantage of a square or irregular C-shape is that it tends to further impede the sliding of articles to the back of the snap hook where the grip is located. This is particularly important where the snap hook is used for animal control, as in the holding of one or more dogs by a leash, because the movement of animals such as dogs is likely to be less predictable than that of inanimate objects such as shopping bags. Thus it is especially desirable under these circumstances for the snap hook to have a shape that improves carrying stability.

The invention will be better understood, and other characteristics and advantages of it will appear more clearly, by referring to the following description and the attached drawings, which show the preferred embodiments of the snap hook of the present invention.

BRIEF DESCRIPTION OF THE DRAWINGS

FIG. 1 is a side view of a snap hook of the present invention.

FIG. 4 is a side view of another alternate embodiment of the snap hook of the present invention.

FIG. 5 shows a snap hook of the present invention attached to the collar of a dog.

FIG. 8 shows an alternate embodiment of the gate on the snap hook of the present invention in the closed position.

FIG. 9 shows the alternate embodiment of FIG. 8 in the open position.

DESCRIPTION OF THE PREFERRED EMBODIMENTS

Figure 3:
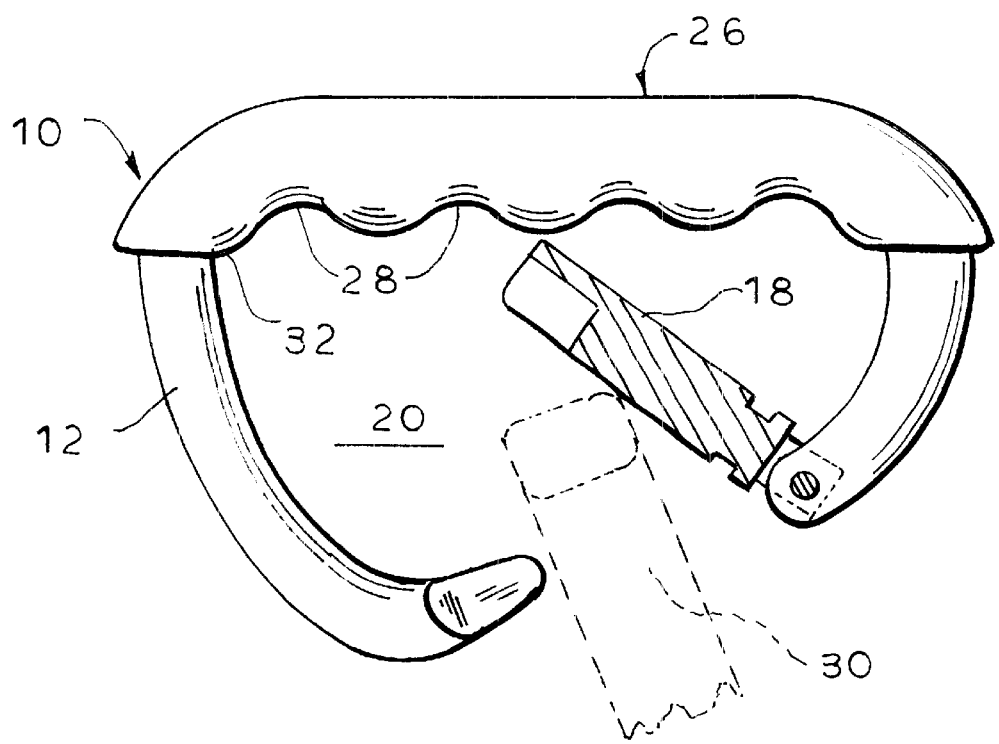
FIG. 3 is a side view of an alternate embodiment of the snap hook of the present invention.

In FIG. 1, the snap hook 10 of the present invention is shown. Snap hook 10 includes C-shaped back portion 12 which has two ends 14, 16 and gate 18 connected by a hinge 22 allowing gate 18 to move from the closed position (shown) to an open position by articulating about the axis of hinge 22. Preferably, gate 18 is biased in the closed position, creating an interior 20 defined by the periphery of the snap hook, within which one or more objects 30, such as loops of rope or straps connected to items to be carried can be secured. The construction described thus far is common to known snap hooks such as carabiners, and will therefore not be discussed in further detail.

Unlike carabiners used in mountaineering which are typically exposed to enormous stresses during use, snap hook 10 is intended to be held unaided by the user and for this reason needs not sustain forces far exceeding the strength of a human hand. Therefore, the snap hook of the present invention may be made of any rigid material such as aluminum or preferably plastic. Forming the back portion 12 of particularly strong, hi-tech materials such as titanium is also possible, but adds to the cost of the snap hook 10 without significantly improving function. In certain applications, wood, hard rubber or leather and combinations thereof may also be used.

Figure 2:
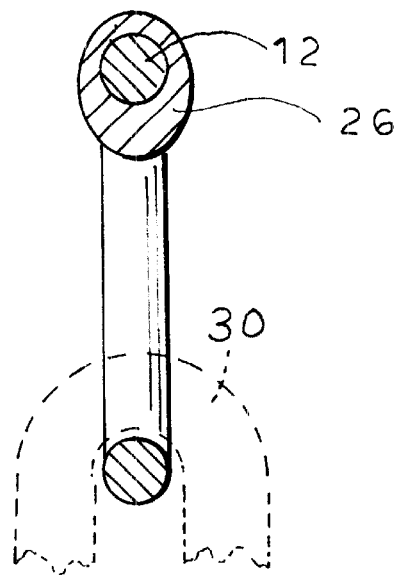
FIG. 2 is a section view of the snap hook of FIG. 1.

Snap hook 10 is provided with grip 26 on C-shaped back portion 12 comprising sleeve 24 having knurled surface 28 with alternating grooves and ridges that conform approximately to the position of a user's fingers. As shown in FIGS. 1 and 2, sleeve 24 may be disposed directly over part of C-shaped back portion 12. If sleeve 24 is made of sufficiently flexible material, such as rubber, and is formed in advance, it may be placed on C-shaped back portion 12 by sliding. Alternatively, part of C-shaped back portion 12 which serves as sleeve 24 may be dipped in a liquid foam coating that is air-cured or may be formed of leather that is stitched to form a sleeve. The natural resilience of foam or leather will generally permit the formation of grooves and ridges similar to knurled surface 28 by the pressure exerted by the user's fingers when holding snap hook 10 and will serve a similar function to a knurled surface.

The application of sleeve 24 to C-shaped back portion 12 necessarily creates annular ridges 32 that are raised from the outer surface of the C-shaped back portion 12. Should object 30 slide within interior 20 along the periphery of C-shaped back portion 12, movement onto grip 26 would be impeded by annular ridges 32. This effect resists discomfort and potential injury to the hand of the user and can be exaggerated by flaring the ends of sleeve 24 away from C-shaped back portion 12, thereby increasing the size of annular ridges 32.

FIG. 3 shows snap hook 10 having grip 26 integral with C-shaped back portion 12. In this embodiment, rather than a sleeve, grip 26 is formed of the same material such as plastic that is used to form C-shaped back portion 12 of snap hook 10. Such a construction is appropriate for injection molding or extruding of C-shaped back portion 12 and grip 26 and can include attributes such as knurled surface 28 and annular ridges 32.

FIG. 4 shows an alternate embodiment of snap hook 10 wherein the C-shaped back portion 12 has disposed thereon grip 26 which comprises a sleeve 24, has a knurled surface 28, and annular ridge 32. In this embodiment, an exaggerated ridge one is provided in sleeve 24 opposite annular ridge 32, has the appearance of a fin or a tail, giving snap hook 10 the appearance of a fish or another animal. The exaggerated ridge created by exaggerated ridge 34 serves to block the potential sliding of objects past the exaggerated ridge 34 and into the region of grip 26.

Figure 7:
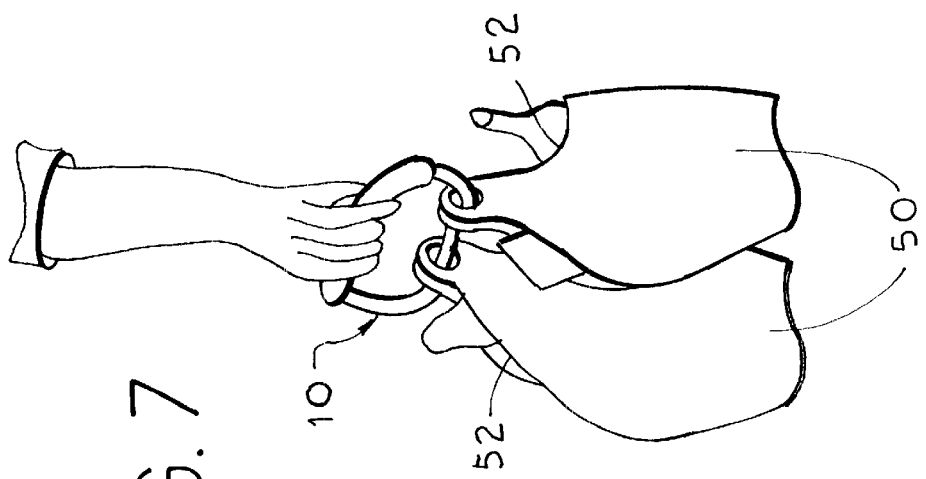
FIG. 7 shows a snap hook of the present invention carrying conventional shopping bags.
Figure 6:
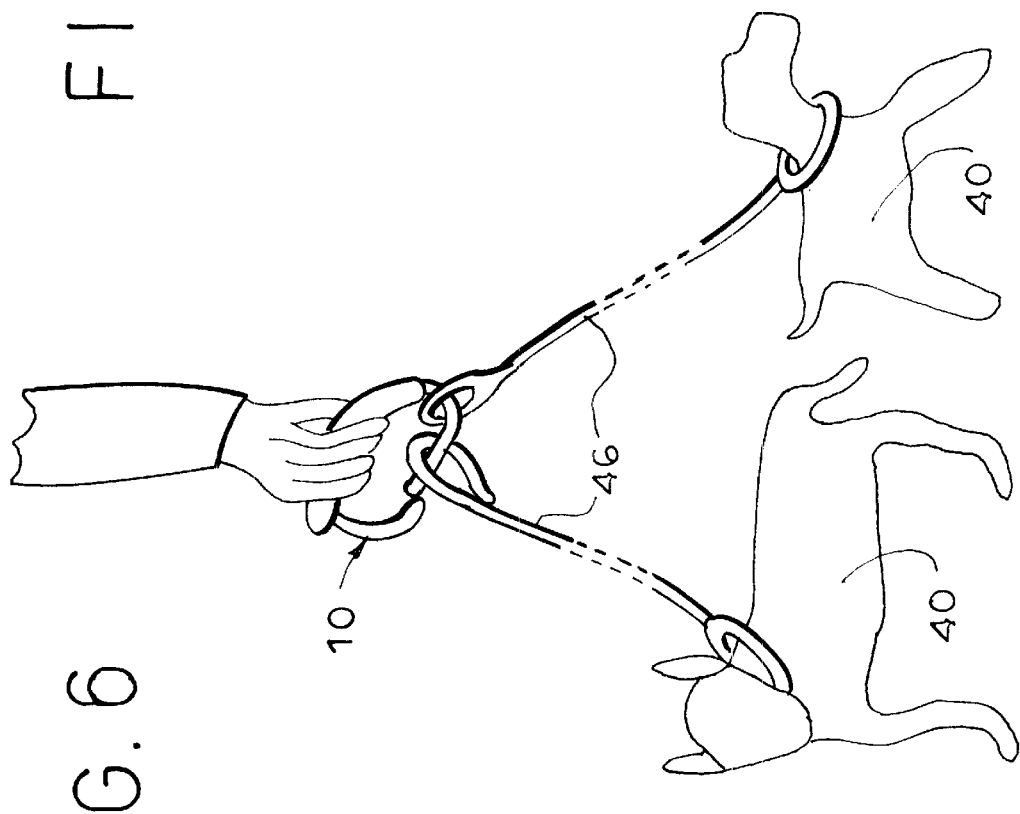
FIG. 6 shows a snap hook of the present invention attached to the leashes of more than one dog.

FIG. 5 shows snap hook 10 as it might be used in animal control, in this case, in holding a dog 40. As shown, collar 42 is attached by ring 44 to snap hook 10 which enables the dog to be controlled by hand. Alternately, snap hook 10 may be attached directly to collar 42. FIG. 6 shows a similar application wherein multiple leashed dogs 40 are connected to a single snap link 10 by their leashes 46. Similarly, FIG. 7 shows snap hook 10 holding a plurality of shopping bags such as common plastic grocery bags with looped handles 52.

FIG.'s. 8 and 9 illustrate an alternative embodiment of gate 18 wherein hinge 22 of FIG. 1 is replaced by a telescoping plunger 62. Spring 64 is shown journalled within one end of C-shaped back portion 12 and a stop 66 is shown at the other end thereof.

In operation, the spring 64 biases telescoping plunger 62 against stop 66. To admit or withdraw item 30 from the interior defined by C-shaped back portion 12, force is applied to telescoping plunger 62 overcoming the force of spring 64 pulling the telescoping plunger away from stop 66, and allowing object 30 to be moved past the gate 60. The alternate embodiment of the gate shown in FIG.'s. 8 and 9 maybe used instead of a hinged gate in cases such as that shown in FIG. 4 where the shape of the C-shaped back portion may not offer sufficient clearance to hinge 18 as would be required for convenient insertion and extraction of objects from snap hook 10.

Though only limited embodiments of the instant invention have been specifically illustrated and described, it is to be understood that variations of the invention will be apparent to those skilled in the art, and that the invention is limited only by the scope of the following claims.

What is claimed is:

1. A method for restraining a small quadruped animal, comprising:

providing a snap hook having a generally C-shaped back, a gate pivotally mounted on a first end of said back, said gate selectively in contact with a second end of said back, defining an open and a closed position which can be selected by a user, and an elongate grip disposed about said back having suitable dimensions for grasping by at least one human hand;

attaching a collar about the neck of said animal, said collar having at least one slip ring provided thereon;

passing said slip ring onto said snap hook while said snap hook is in the open position;

closing said snap hook around said slip ring, said grip thereby providing a terminus from which movement of said animal can be controlled by the hand of said user; and gripping said grip to thereby control said animal.

2. A method for restraining a small quadruped animal, comprising:

providing a snap hook having a generally C-shaped back, a gate pivotally mounted on a first end of said back, said gate selectively in contact with a second end of said back, defining an open and a closed position which can be selected by a user, and an elongate grip disposed about said back having suitable dimensions for grasping by at least one human hand;

attaching a collar of elongate material about the neck of said animal, said collar having at least one slip ring provided thereon;

providing a tether having a first end and a second end, passing said fist end of said tether into said slip ring and affixing said first end thereto, thereby affixing said tether to said collar;

forming a loop in said second end of said tether;

passing said loop into said snap hook while said snap hook is in the open position; and closing said snap hook around said loop, said grip thereby providing a terminus from which movement of said animal can be controlled by the hand of said user; and gripping said grip to thereby control said animal.

3. A method for restraining a small quadruped animal, comprising:

providing a snap hook having a generally C-shaped back, a gate pivotally mounted on a first end of said back, said gate selectively in contact with a second end of said back, defining an open and a closed position which can be selected by a user and an elongate grip having a first end and a second end disposed about said back, said grip having suitable dimensions for grasping by at least one entire human hand and having at least one exaggerated ridge at least one end of said grip;

attaching a collar of elongate material in a loop about the neck of said at least one animal, said collar having at least one slip ring provided thereon;

providing a tether having a first end and a second end, passing said first end of said tether into said slip ring and affixing said first end thereto thereby affixing said tether to said collar;

forming a loop in said second end of said tether;

passing said loop into said snap hook off said grip and between said first and second ends of said grip while said snap hook is in the open position; and closing said snap hook around said loop, whereby said loop Is prevented from movement onto said grip by said exaggerated ridge, said grip thereby providing a terminus from which movement of said at least one animal can be controlled by the hand of said user; and gripping said grip to thereby control said animal.

* * * * *